United States Patent Office 3,511,908
Patented May 12, 1970

3,511,908
METHOD OF MANUFACTURING
ANAPLASMOSIS VACCINE
William Elihu Brock, Stillwater, and Charles Clifton Pearson and Ira Olin Kliewer, Pawhuska, Okla., assignors to Oklahoma State University of Agriculture & Applied Science, Stillwater, Okla., a corporation of Oklahoma
No Drawing. Filed June 23, 1965, Ser. No. 466,450
Int. Cl. A61r 23/00
U.S. Cl. 424—88    8 Claims

ABSTRACT OF THE DISCLOSURE

This invention relates to a method of manufacturing and administering an anaplasmosis vaccine. More particularly, the invention includes the steps of exsanguinating an anaplasmosis infected bovine, centrifuging out the red blood cells obtained, ultrasonicating the cells to rupture the cells to release anaplasma bodies therefrom without destroying such bodies, separating out the anaplasma bodies, freeze drying the anaplasma bodies, and mixing adjuvant with the freeze dry bodies. Inoculation of a bovine is achieved by subcutaneously injecting vaccine containing 10 milligrams of the freeze dryed anaplasma bodies. The inoculation is preferably repeated by a second such injection six weeks to three months after the first injection.

---

This invention relates to a method of manufacturing anaplasmosis antigen. More particularly, this invention relates to a method of manufacturing anaplasmosis vaccine and use of the vaccine to immunize cattle.

Anaplasmosis is an infectious disease of cattle which causes destruction of the red blood cells. The disease is caused by a minute parasite, Anaplasma marginale, which grows in the red blood cells of infected cattle. Anaplasmosis has been observed on all the continents of the world but it is a problem to cattlemen only in the warm, humid areas where certain insects that transmit the disease are numerous. The disease is primarily transmitted from infected to healthy animals by insects such as horse flies, stable flies and mosquitoes and ticks, but may also be transmitted by unclean surgical instruments.

In the United States, anaplasmosis has been found in thirty-nine of the fifty states and is a major cause of economic loss of cattle from anaplasmosis in approximately twenty states. Death losses in cattle from anaplasmosis are presently about 48 to 50 million dollars a year in the United States. An estimated 30 to 50 percent of the infected cattle die of the disease. Cattle that live through the disease lose weight, abort calves and recover from the illness slowly over a two to three month period. Cattle that recover from anaplasmosis are carriers of the disease for the rest of their lives since their blood continues to contain the Anaplasma marginale parasite.

No completely successful treatment of cattle ill from anaplasmosis has been developed to date. Antibiotics such as aureomycin and terramycin are used in attempts to destroy the parasite in infected animals. Some veterinarians use blood transfusions to replace the lost red blood cells in highly infected animals. Drugs to stimulate the production of new red cells are often given. Each of these methods as well as other methods of treating anaplasmosis are only partially successful and, as a result, the loss due to anaplasmosis has continued at a high rate.

Programs have been undertaken to prevent anaplasmosis by such steps as careful insect control, care in the sanitization of dehorning and surgical equipment, and the isolation of known carrier animals. In spite of such programs and the previous mentioned methods of treatment, the loss caused by anaplasmosis has continued. Generally speaking, it is the object of this invention to provide an improved method of manufacturing anaplasmosis antigen and a vaccine from such antigen and including methods of utilizing such vaccine for the immunization of cattle.

More specifically, a primary object of the invention is to provide a method of manufacturing anaplasmosis antigen.

Another object of this invention is to provide a method of manufacturing an anaplasmosis vaccine.

A further object of this invention is to provide a method of immunizing cattle against anaplasmosis.

Further objects and advantages and a fuller understanding of the invention will become apparent from the following description and claims.

Basically the invention can be divided into three interdependent methods. The first, and most important, is a method of manufacturing anaplasmosis antigen. The second is a method of preparing a vaccine from the obtained antigen. The third is a method of immunization utilizing the vaccine.

Method of manufacturing anaplasmosis antigen

The method of manufacturing anaplasmosis antigen according to this invention involves the sequential operation of eight basic steps which will be described in detail.

Step one

The first step is to obtain a quantity of anaplasmosis infected bovine whole blood. This is accomplished by exsanguinating a highly infected animal. In tests utilized to develop and prove the method of this invention, this step consisted of first inoculating an anaplasmosis susceptible splenectomized calf with ten mililiters of anaplasmosis carrier blood. When the maximum number of anaplasma infected red blood cells were present in the circulation system of the calf, the calf was exsanguinated. All of the anaplasma infected cells were transfused into an adult cow. The cow was exsanguinated when the maximum number of anaplasma infected red blood cells were present in her circulation system. Generally, in order for infected blood to be at an efficient level for the manufacture of antigen, the number of anaplasma infected red blood cells must be at least $2.0 \times 10^6$ per cubic millimeter of whole blood. While, as previously mentioned, in the development of the invention it was necessary, to facilitate the availability of sufficient quantities of highly infected blood, to begin by inoculating anaplasmosis susceptible calf, highly infected bovine blood from any source, whether from a naturally infected or an intentionally infected cow or calf can serve as the source of raw material for the production of the antigen by the methods of this invention.

Step two

The highly infected whole blood is then mixed with an anticoagulant to prevent clotting. Such anticoagulant may be of the known types, including citrate, oxalate or EDTA, or any other comparable anticoagulant useful for the purpose and known to the art. The anticoagulant is added for the purpose of maintaining the whole blood in liquid form.

Step three

In this third step, the whole blood is centrifuged at a speed and time duration sufficient to cause the red blood cells to sediment. Care must be exercised in this step that the speed and duration of centrifugation is sufficient to cause substantially complete sedimentation of the red blood cells (for efficient end product production) but at the same time the centrifugation must not be so great nor of such duration as to cause rupture of the cells. It has been found that centrifugation at a speed of approximately 500 gravities for a period of ten to fifteen minutes produced proper sedimentation. The supernatant plasma obtained from the centrifugation is discarded and the sedimented red blood cells are used for the continuation of the steps of the method utilized in achieving the final antigen.

Step four

The red blood cells obtained as sediment from the centrifugation of step three are next suspended in a physiologic saline solution. Such solution is known in the art and is composed of approximately 0.85% weight salt (NaCl) in distilled water. The purpose of this saline solution suspension is twofold, the first is to provide a fluid medium for the subsequent steps of the method and the second is to afford cleansing of the cells.

Step five

The suspended cell solution is ultrasonicated to rupture the cells and permit the exit therefrom of the included anaplasma bodies. Such ultrasonication was practiced in the development of the method of this invention by the use of a cooled constant flow Branson Sonicator. The apparatus must be operated at a rate to produce substantially complete rupture of all of the red blood cells without disintegration of the anaplasma bodies. The output of the ultrasonication step is a saline solution having suspended therein ruptured red blood cells affording release of the included anaplasma bodies.

Step six

The suspended ruptured red blood cells are then centrifuged to obtain sedimentation of the anaplasma bodies. Specifically, as practiced during development of the method of this invention, a Sharples Constant Flow Centrifuge was utilized and was run at approximately 20,000 r.p.m. with a flow rate of suspended solution sufficient to sediment all the anaplasma bodies. Frequent microscopic examination of the supernatant fluid produced by the centrifugation was utilized to check the flow rate required to obtain substantially complete sedimentation.

Step seven

In the seventh step the supernatant fluid containing primarily the ruptured red blood cells suspended in the saline solution are discarded and the sedimented anaplasma bodies (antigen) are suspended in distilled water. A more particular practice of this step includes the accurate proportioning of the quantity of distilled water used as a suspending medium to provide a suspended solution containing approximately 100 mg. of antigen (dried weight) per 10 milliliters of suspension. The selection of this proportion was for the purpose of providing accurate measurement of dosage aliquots.

Step eight

The final step in the basic process of manufacturing anaplasmosis antigen according to the system of this invention is to freeze-dry (lyophilize) the suspended anaplasma bodies to obtain dried antigen. The method particularly used in the development and testing of this invention, and the method highly preferred, is to divide the suspended anaplasma bodies (antigen) obtained in step seven into vials so that each vial will contain the desired weight of dried antigen and freeze-dry the suspended material in these vials. The vials are then vacuum sealed. These vacuum sealed vials of dried antigen may then be kept without freezing for a period of at least twelve months without impairing the effectiveness of the antigen.

As previously mentioned with respect to step four, one of the reasons for suspending the red blood cells in a saline solution is to clean the cells. A preferred method is to sediment the red blood cells by centrifugation at least three times in saline solution to insure thorough cleaning of the cells and therefore a higher quality of the end product. Further, in the preferred method, the cells are suspended in approximately two times their packed volume of saline solution preparatory to the ultrasonication of step five.

Preparation of vaccine

The vaccine is prepared by suspending the dried anaplasmosis antigen in an adjuvant. This may be accomplished easily when the antigen is stored in the sealed vials as previously mentioned by injecting into the vials the required amount of adjuvant to obtain the suspended fluid. Preferably, one to five milliliters of adjuvant is mixed with ten milligrams of dried antigen to produce the vaccine.

The adjuvant utilized may be of several types including light medicinal mineral oil or specially prepared adjuvants.

Inoculation

A variety of method of inoculation utilizing the vaccine of this invention have been investigated but it has been learned that the prefered method is to subcutaneously inoculate animals with one to five milliliters of vaccine containing ten milligrams of antigen prepared according to the previous disclosed method, followed by a second ten milligram inoculation at least six weeks but not more than three months after the first inoculation. A single inoculation utilizing a vaccine containing 250 milligrams of antigen has been found successful but prohibitively expensive.

Test results

To test the effectiveness of the vaccine produced by the methods of this invention, an experimental group of 45 uniform Hereford female two year old cows was selected. The cows were all tested by the complement-fixation test for anaplasmosis and were negative to the test before being placed in the experimental group. While the test involved the evaluation of various details not relevant to the basic methods of the invention, fundamentally the test included dividing the cattle into two groups, that is, a group inoculated by the vaccine manufactured by the methods of this invention, and a non-vaccinated group. Later each of the test cows was injected with an equal amount of whole blood obtained from an anaplasmosis infected cow. Following inoculation with the infected blood, of the vaccinated group only 5.7 percent became sufficiently anemic to be moderately ill, 52.8 percent showed moderate anemia without illness, and 41.5 showed no anemia or illness. Of the unvaccinated group, all became severely anemic and ill.

An extremely important part of the invention is the discovery that two doses of 10 milligrams of antigen each suspended in 5 milliliters or less of adjuvant, administered at least six weeks apart, provides sufficient immunity to prevent death to cattle from anaplasmosis. The basic active ingredient of the vaccine is the antigen and, according to the principles of this invention, each dose consists of at least approximately 10 milligrams of the antigen obtained by the steps described. The 10 milligrams of antigen is suspended in an adjuvant as a vehicle to facilitate inoculation and preferably one to five milliliters of adjuvant is used to suspend the 10 milligrams of antigen.

This invention provides a means of manufacturing anaplasmosis antigen utilized to produce a vaccine whose success in producing immunity to anaplasmosis infection has been demonstrated in controlled tests. While the invention has been described with a certain degree of particularity, it is manifest that many changes may be made in the methods, the sequence of steps, the interposition of additional and supplemental steps, and so forth, without departing from the spirit and scope of the invention which is set forth in the appended claims.

What is claimed:
1. A method of manufacturing anaplasmosis antigen comprising the steps of:
  (a) exsanguinating a bovine highly infected with anaplasmosis;

(b) mixing anticoagulant with the obtained blood;
(c) centrifuging the anticoagulated blood to sediment the red blood cells without their rupture;
(d) suspending the red blood cells in a physiologic saline solution;
(e) ultrasonicating the suspended solution to rupture the red blood cells to release anaplasma bodies therefrom without destroying such bodies;
(f) centrifuging the suspended solution to sediment the anaplasma bodies;
(g) suspending the sediment anaplasma bodies in distilled water; and
(h) freeze drying the suspended anaplasma bodies to obtain dried antigen.

2. A method of manufacturing anaplasmosis antigen according to claim 1 wherein under step (g) the sediment anaplasma bodies are suspended at a ratio in distilled water to provide by step (h) approximately 100 milligrams of dried antigen per 10 milliliters of suspension.

3. A method of manufacturing anaplasmosis antigen according to claim 2 including dispensing the suspended anaplasma bodies obtained from step (g) into vials of 10 milliliters aliquots each preparatory to freeze drying of step (h) and including the additional step of vacuum sealing the vials of dried antigen.

4. A method of manufacturing anaplasmosis antigen comprising the steps of:
(a) exsanguinating a bovine highly infected with anaplasmosis;
(b) mixing anticoagulant with the obtained blood;
(c) centrifuging the anticoagulated obtained blood to sediment the red blood cells without their rupture;
(d) suspending the red blood cells in a physiologic saline solution;
(e) washing the red blood cells in the saline solution by centrifugation to sediment the red blood cells therefrom;
(f) resuspending the washed red blood cells in saline solution;
(g) ultrasonicating the suspended solution to rupture the red blood cells to release anaplasma bodies therefrom without destroying such bodies;
(h) centrifuging the suspended solution to sediment the anaplasma bodies;
(i) suspending the sediment anaplasma bodies in distilled water; and
(j) freeze drying the suspended anaplasma bodies to obtain dried antigen.

5. A method of manufacturing anaplasmosis antigen according to claim 4 wherein steps (c) and (e) are repeated at least three times each to achieve thorough washing of the red blood cells.

6. A method of manufacturing anaplasmosis antigen according to claim 4 including the step of suspending the dried antigen in an adjuvant to obtain an anaplasmosis vaccine.

7. A method of manufacturing anaplasmosis antigen according to claim 4 wherein step (c) consists of centrifuging the obtained blood at about 500 gravities for a period of from 10 to 15 minutes.

8. A method of manufacturing anaplasmosis antigen according to claim 4 wherein under step (i) the sediment anaplasma bodies are suspended at a ratio in distilled water to provide by step (j) approximately 100 milligrams of dried antigen per 10 milliliters of suspension, and including the steps of dispensing the desired amount of suspended anaplasma bodies from step (i) into vials preparatory to freeze drying of step (j) and vacuum sealing the vials of dried antigen.

References Cited

Bedell et al.: American Journal of Veterinary Research, vol. 24, pp. 278–282, March 1963, 167–78.

RICHARD L. HUFF, Primary Examiner